United States Patent
Shibuta

(10) Patent No.: US 6,700,921 B1
(45) Date of Patent: Mar. 2, 2004

(54) SPREAD-SPECTRUM COMMUNICATION APPARATUS

(75) Inventor: Akira Shibuta, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/479,635

(22) Filed: Jan. 7, 2000

(30) Foreign Application Priority Data

| Jan. 7, 1999 | (JP) | 11-001730 |
| Jan. 18, 1999 | (JP) | 11-008781 |
| Feb. 15, 1999 | (JP) | 11-035333 |

(51) Int. Cl.[7] .............................. H04B 1/707
(52) U.S. Cl. ............... 375/141; 375/317; 455/245.1
(58) Field of Search ................... 375/130, 140, 375/141, 142, 145, 146, 147, 149, 219, 220, 260, 261, 298, 316, 317, 324, 326, 327, 329, 343, 355, 362, 367; 370/206, 320, 324, 335, 342, 344, 441, 350; 455/208, 209, 210, 212, 218, 219, 222, 245.1

(56) References Cited

U.S. PATENT DOCUMENTS

| 5,101,417 A | * | 3/1992 | Richley et al. ............. 375/147 |
| 5,691,666 A | * | 11/1997 | Owen .......................... 329/319 |
| 5,694,417 A | * | 12/1997 | Andren et al. ............... 375/150 |
| 5,712,870 A | * | 1/1998 | Petrick ........................ 375/206 |
| 5,745,531 A | * | 4/1998 | Sawahashi et al. ......... 375/345 |
| 5,878,087 A | * | 3/1999 | Ichihara ...................... 375/316 |
| 5,940,435 A | * | 8/1999 | Hendrickson ............... 375/147 |
| 6,263,013 B1 | * | 7/2001 | Hendrickson ............... 375/150 |
| 6,314,128 B1 | * | 11/2001 | Bunker et al. .............. 375/149 |

FOREIGN PATENT DOCUMENTS

JP   07336283   12/1995

* cited by examiner

Primary Examiner—Chi Pham
Assistant Examiner—Khanh Cong Tran
(74) Attorney, Agent, or Firm—RatnerPrestia

(57) ABSTRACT

A spread-spectrum communication apparatus includes an analog modulator and demodulator for modulating and demodulating information in its transmitter and receiver respectively. The apparatus also includes a spreader and de-spreader for modulating and demodulating a spread-spectrum signal respectively in its transmitter and receiver. This structure widens a dynamic range of the RSSI with an inexpensive and simple circuit. This structure also allows the apparatus to operate in a stable manner against an intense input signal, to detect an "out of sync" in a highly reliable manner and move immediately to a "sync-tracking mode".

22 Claims, 14 Drawing Sheets

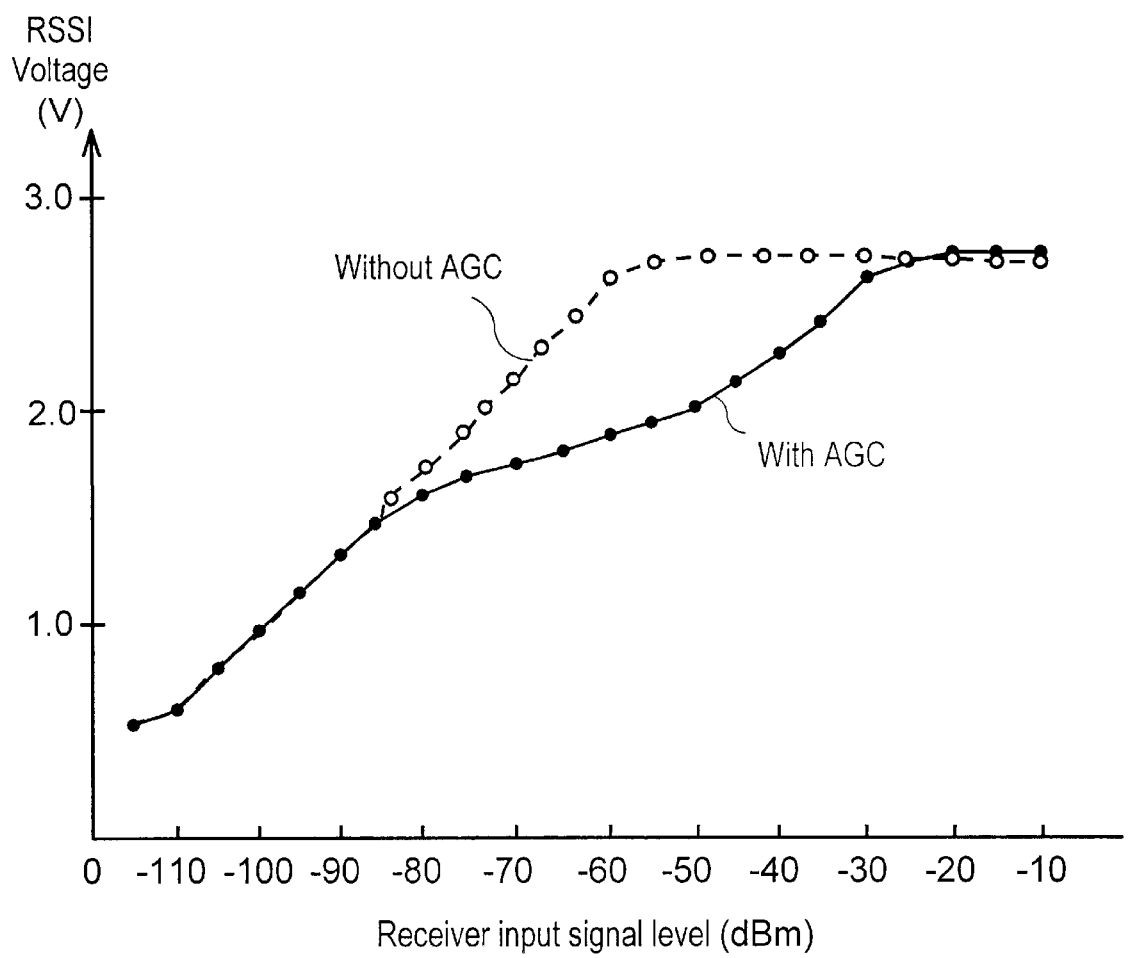

SPREAD-SPECTRUM COMMUNICATION APPARATUS

FIELD OF THE INVENTION

The present invention relates to a communication apparatus wirelessly coupled to an intended receiver by the spread spectrum method.

BACKGROUND OF THE INVENTION

Since the Federal Communications Commission (FCC) has opened Industrial Scientific and Medical (ISM) bands to the public as a communication tool using the spread spectrum method, numbers of new products employing the spread spectrum method have been put in various market segments, such as cordless telephones, of communication industry. The spread spectrum method features its inherent resistance to interference and enhancing privacy of communication. FCC has approved a transmission by the spread spectrum method with a larger power than a conventional analog communication method. Therefore, the spread spectrum method has an advantage of enlarging a communicable distance.

Products employing this method are, in general, designed based on digital communication method, and they are not only more expensive but also have much complicated structures than those designed based on analog method. An analog based spread spectrum communication apparatus employing a simple and inexpensive circuit on top of the conventional apparatus is thus available in the market, and it can perform spread-spectrum and de-spread spectrum. This apparatus is illustrated in FIGS. 13A and 13B.

An information signal fed into transmitter 400 shown in FIG. 13A is frequency-modulated (FM) by FM modulator 401 in the same manner as the conventional analog communication, thereby producing narrow-band FM signal 501. In spreader 402, signal 501 is modulated into spread-spectrum modulated signal 502 by spreading-code 504 produced by pseudo noise (PN) code generator 404. Then signal 502 is converted and amplified into a high frequency band by radio frequency (RF) transmitter 403, whereby signal 503 is radiated into the air from transmitting antenna 405.

Antenna 411 of receiver 410 illustrated in FIG. 13B receives this radio wave signal, and RF receiver 412 amplifies this signal. The resultant signal tapped off from RF receiver 412, i.e. RF spread-modulated signal 512 and de-spreading code 515 produced by PN code generator 415 are electrically multiplied together in de-spreader 413. In this multiplication, sync circuit 416 controls timings of de-spreading code 515 thereby synchronizing code 515 with signal 512. As a result, original narrow band FM signal 513 is obtainable as an output signal from de-spreader 413. This FM signal 513 is converted and filtered by intermediate frequency (IF) section 414 into IF signal 514, which is demodulated to the original information signal by FM demodulator 418.

Sync circuit 416 performs the following correlative operation thereby realizing de-spreading. De-spreading code 515 used in the de-spreading is identical to spreading code 504 used in the spreading, and is tapped off at the same speed as that of code 504. A signal level of the signal tapped off from IF section 414 is supplied as output voltage 614 of a Received Signal Strength Indicator (RSSI). If the output voltage 614 is monitored, it is understood that when a phase of de-spreading code 515 is synchronized with that of RF spreading modulated signal 512, i.e. the correlation value takes a maximum value, the RSSI voltage reaches to the maximum level. In other words, the de-spread is realized when the maximum RSSI voltage is acquired and maintained by sliding the phase of de-spreading code 515. In actual, as shown in FIG. 13B, sync circuit 416 transmits phase-adjusting-signal 516 to PN code generator 415 thereby adjusting the phase of its output signal 515, and then RSSI voltage 614 is digitized by A/D converter 417 thereby obtaining RSSI data 517. A peak value of data 517 is acquired and maintained.

In the event of sync-loss during the communication, it is impossible to restore the sync when a sync-holding-mode is kept going, the sync circuit, therefore, should move immediately to a sync-tracking-mode from the sync-holding-mode, and try to acquire the sync. This is an outline of the performance.

In the case of digital communication, an "out of sync" can be detected with ease by monitoring an error-rate of the information demodulated finally in the receiver; however, in the case of analog communication, this method is difficult to use, and another method as follows is thus employed. Recognizing-signals such as data or tones dedicated to recognition only are transmitted during the communication, and the receiver monitors these signals to detect the "out of sync". These recognizing-signals are independent of the information to be transmitted.

The analog-based spread spectrum communication apparatus discussed above is less expensive as well as simpler in circuit structure and operation than the digital-based one. Since the FM demodulator has inherent excellent receiving sensitivity, a maximum communicative distance can be extended. Further, a voice is free from being coded at transmission, a delay in the voice due to coding process never occurs. As such, the analog-based apparatus have several advantages over the digital-based one; however, it also has the following problems:

(1) When the receiver receives an intense signal, the de-spreader does not operate in a normal way due to saturation of the RSSI, i.e. the receiver has a narrow dynamic range.

FIGS. 14A and 14B are graphs illustrating influences of the saturation of a conventional RSSI to a detection of correlation. As points B in the Figs. illustrate, signal-to-noise ratio (SNR) at detecting correlation by the RSSI in the sync circuit deteriorates with regard to an input of which peak level exceeds a linearly-operating-region of RSSI. This status encourages sync-errors to occur. On the other hand, points A in the Figs. illustrate a case when the peak level of the input is not beyond the linearly-operating-region of RSSI. The RSSI mounted to general purpose ICs for IF has a dynamic range of ca. 60 dB in general, which is often short of the level required by various communication apparatuses, although the required levels depend on applications of the apparatuses.

(2) If the "out of sync" occurs due to fading or cross-talk, the sync-error rate cannot be monitored and thus it is difficult to detect the "out of sync".

Although the method discussed previously is available, i.e. recognizing-signals such as data or tones dedicated to recognition only are always transmitted together with the information during the communication, and the receiver monitors these signals, this method requires a circuit separating the signals from the information, thereby complicating the circuit structure and operation as well as increasing the cost.

The conventional spread-spectrum-communication apparatus has thus two major problems as discussed above.

SUMMARY OF THE INVENTION

The present invention addresses the problems discussed above and provides a spread-spectrum-communication apparatus which employs a simple and inexpensive circuit, thereby settling an insufficient dynamic range of a receiver as well as stabilizing an operation against an intense signal. The apparatus of the present invention also detects an "out of sync" with reliability, thereby moving the operation immediately into a sync-tracking-mode.

A spread spectrum communication apparatus of the present invention comprises a transmitter and receiver.

The transmitter comprises the following elements:

an FM modulator for modulating an information signal in analog mode;

a spreader for converting an output signal from the FM modulator into a spread-spectrum signal;

an RF transmitter for converting the spreading signal into a high-frequency signal;

a transmitting antenna for radiating an output signal from the RF transmitter into the air.

The receiver comprises the following elements:

a receiving antenna for receiving the high frequency signal radiated from the transmitter;

an RF receiver for amplifying the received high frequency signal;

an RSSI for detecting an intensity of the signal;

a de-spreader for restoring the spread-spectrum signal into a narrow band FM modulating signal;

an FM demodulator for obtaining the original information signal from the modulated signal.

The apparatus further comprises a limiter circuit on a signal input side of the de-spreader so that stable de-spreading against an intense signal fed into the receiver can be expected. The apparatus also detects with reliability an "out of sync" during a communication thereby moving the operation immediately to sync-tracking mode.

BRIEF DESCRIPTION OF THE DRAWINGS

FIG. 6 shows characteristics illustrating the relations between an input level at the receiver and an RSSI voltage in two cases, i.e. one is the case when AGC is not added to the spread spectrum communication apparatus, the other case is when the AGC is added to the apparatus.

DETAILED DESCRIPTION OF THE PREFERRED EMBODIMENT

An exemplary embodiment of the present invention is demonstrated hereinafter with reference to the accompanying drawings.

Figure 1:
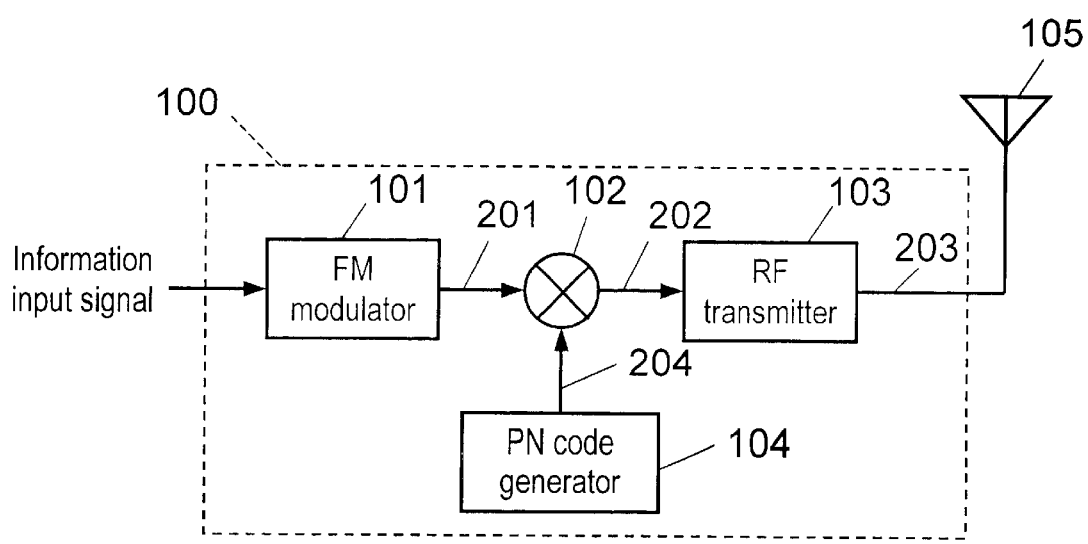
FIG. 1 is a block diagram illustrating a transmitter making up a spread spectrum communication apparatus in accordance with an exemplary embodiment of the present invention.
Figure 2:
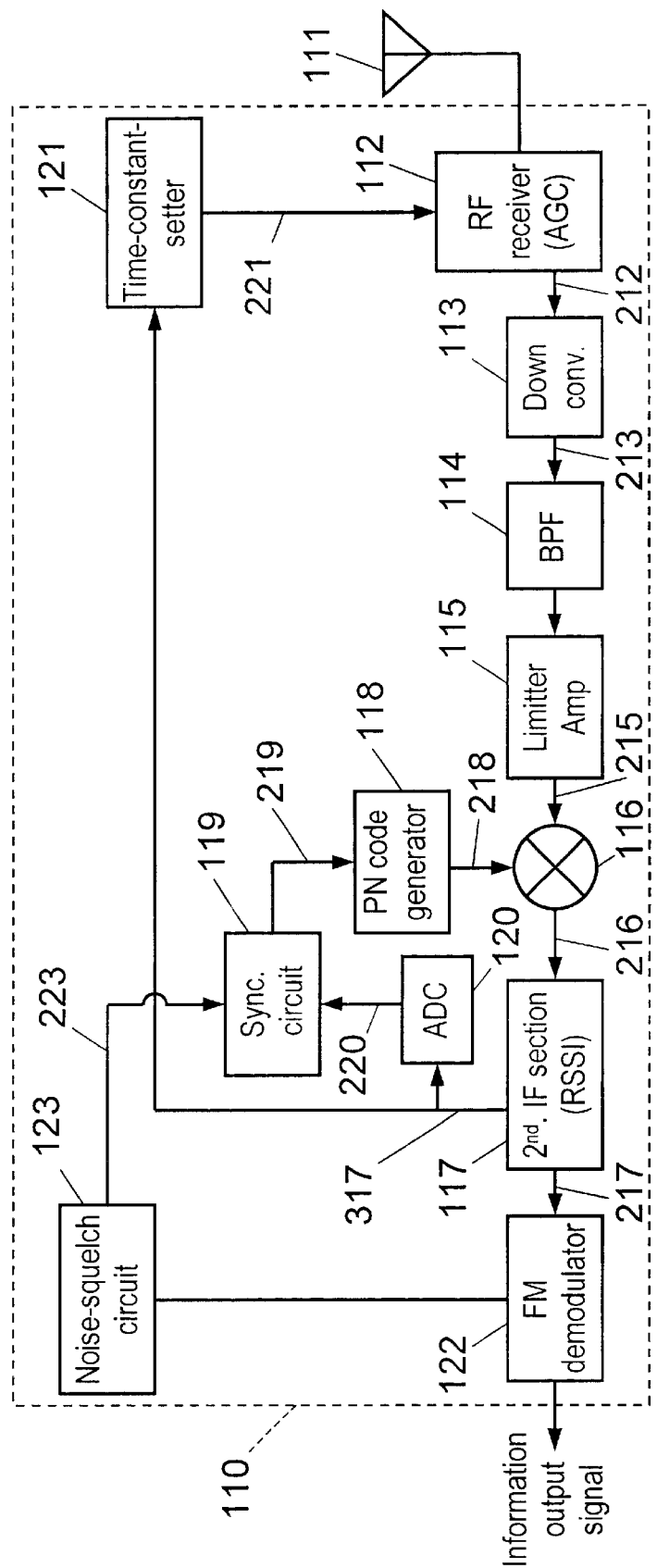
FIG. 2 is a block diagram illustrating a receiver making up a spread spectrum communication apparatus in accordance with the exemplary embodiment of the present invention.

FIG. 1 and FIG. 2 are the block diagrams illustrating the spread-spectrum communication apparatus in accordance with the exemplary embodiment of the present invention. In FIG. 1, transmitter 100 firstly receives an information signal, then FM demodulator 101 demodulates the signal into narrow-band FM signal 201 and outputs it. Signal 201 is an identical signal to that used in a conventional analog-based communication method. Spreader 102 multiplies signal 201 and spreading signal 204 produced in PN code generator 104 together. The resultant production is referred to as spread-spectrum-modulated signal 202. RF transmitter 103 converts and amplifies this signal 202 into a high frequency signal, which is output as RF spread-modulated signal 203. Then transmitting antenna 105 radiates signal 203 as a radio signal into the air. Receiving antenna 111 mounted to the receiver shown in FIG. 2 receives this radio signal. The received signal, i.e. the RF spread-modulated signal, is amplified by RF receiver 112, and the resultant output signal 212 is converted into a first IF signal by down-converter 113. Signal 213 passes band-pass-filter 114 and reaches limiter amplifier 115. RF spread-modulated signal 215, i.e. the first IF signal supplied from limiter amplifier 115, is multiplied by de-spreading code 218 in de-spreader 116, in other words, de-spreading is performed.

When the de-spreading is performed, sync circuit 119 outputs phase-adjusting signal 219 to PN code generator 118 to control the timing of generator 118 so that the timing can be synchronized with a PN code included in the RF spread-modulated signal. As a result, original narrow band FM signal 216 is supplied as an output from de-spreader 116. This signal 216 is further converted and filtered into second IF signal 217 by second IF section 117, and then demodulated to the original information signal by FM demodulator 122. Sync circuit 119 a kind of sliding correlator uses signal 317 for its correlating operation. Signal 317 is supplied from the RSSI making up IF section 117 illustrated in FIG. 2. The correlating operation is identical to the conventional one previously discussed, i.e. de-spreading code 218 used in the receiver is identical to spreading code 204 used in the transmitter both in speed and code sequence. An output-signal-level of second IF section 117 is output as output signal 317 from the RSSI. Monitoring signal 317 reveals the following fact: When a phase of de-spreading code 218 is synchronized with a phase of the PN code included in spread-modulated signal 215, i.e. when the correlating value reaches its maximum value, the maximum RSSI voltage is obtainable. In other words, a phase of de-spreading code 218 is slid thereby tracking and holding the phase obtained from the maximum RSSI voltage. This is a mechanism of performing the de-spreading.

In actual, firstly, an RSSI voltage is digitized by A/D converter 120 into RSSI data 220. Next, sync circuit 119 transmits phase-adjusting signal 219 to PN code generator 118 thereby controlling a phase of de-spreading code 218, so that a peak position of data 220 can be tracked and held. If an "out of sync" occurs during the communication, the sync circuit immediately moves to the sync-tracking-mode from the sync-holding-mode thereby trying to acquire the sync. Because the sync-holding-mode cannot restore the apparatus to the normal operation. In this embodiment, both of spreading code 204 and de-spreading code 218 employ 1.28 Mcps 127 chips of PN code in M sequence.

As such, sync circuit 119 has two operating modes, i.e. synctracking-mode and sync-holding-mode. Examples of these modes are detailed hereinafter.

First, the sync-tracking-mode determines a rough position of sync in the unit of ½ chip through the following steps (A1), (A2) and (A3).

(A1) First, output de-spreading code 218 for a given period with an appropriate phase from PN code generator 118, then record RSSI data 220 and the phase.

(A2) Second, shift the phase by 1□2 chip, then output de-spreading code 218 for a given period. If data 220 at this time is higher than the recorded data, record the higher data and its phase. The maximum data 220 and its phase can be recorded by repeating the operations.

(A3) Third, repeat the steps discussed above for each phase in the unit of ½ chip, then obtain the maximum data 220, of which position is rendered a sync point, and jump the phase of de-spreading code to the phase of the sync point. Tracking-sync is thus completed.

After sync is tracked, the sync circuit moves to sync-holding-mode. This mode operates through the following steps (B1), (B2) and (B3).

(B1) Output de-spreading code 218 for a given period with the phase at the sync track, then record RSSI data 220.

(B2) Shift the phase of de-spreading code 218 in an arbitrary direction by ⅛ chip, then output de-spreading code 218 for a given period. Compare data 220 at this time with the recorded data, then determine the next phase-change-direction. In other words, when an RSSI data value increases, the next phase is shifted by ⅛ chip in the same direction as the previous one. When the RSSI data value decreases, the next phase is shifted by ⅛ chip in the reverse direction. When the data stays the same, the next phase is not shifted.

(B3) Repeat the steps discussed above, and hold the phases within±⅛ chip from the sync point.

Figures 3A, 3B:
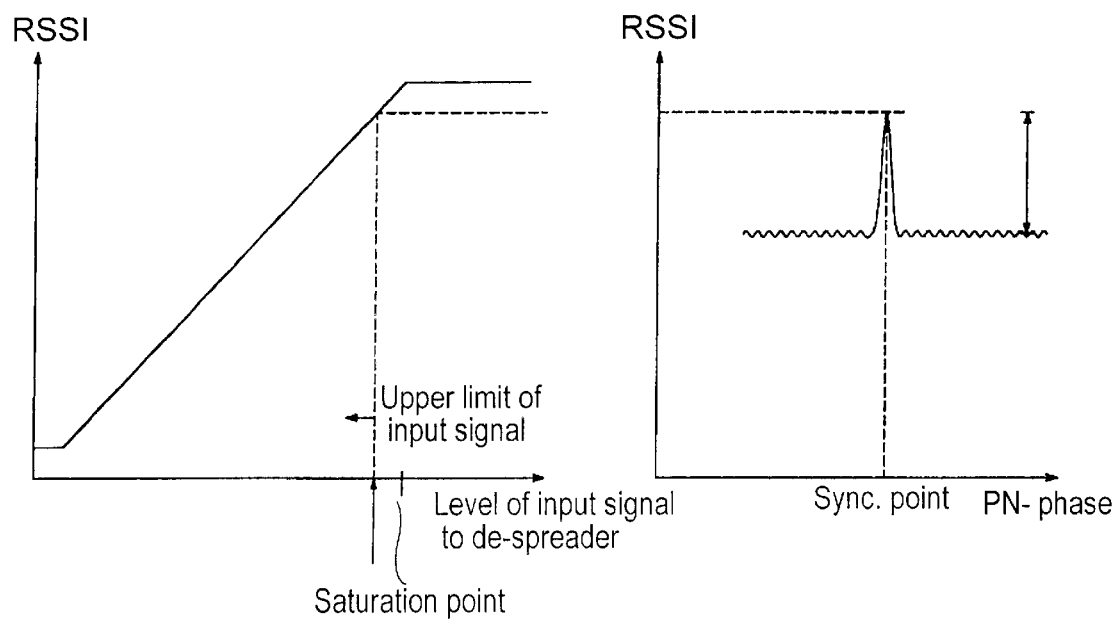
FIG. 3 contains graphs illustrating an effect produced by adding a limiter amplifier in accordance with the exemplary embodiment of the present invention.
Figure 4A:
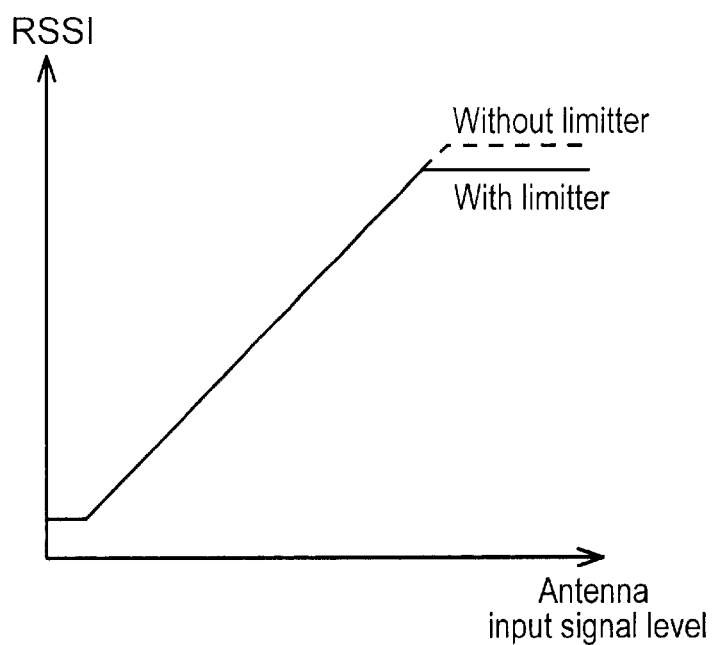
FIG. 4 contains graphs illustrating an improvement in a dynamic range of an RSSI effected by adding an automatic gain control (AGC) to the spread spectrum communication apparatus.
Figure 4B:
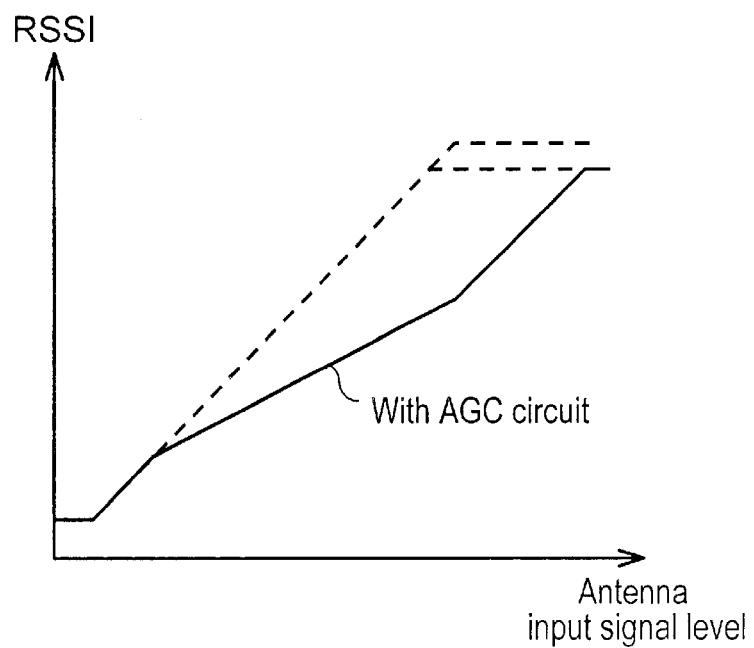

The advantages of the present invention are detailed hereinafter. In this embodiment, a double-super-heterodyne method is employed for the signal processing in the receiver. A first IF signal processor includes band-pass-filter 114 and limiter amplifier 115. Further, at the previous stage to the limiter amplifier, RF receiver 112 having an AGC function is provided. Limiter amplifier 115 uses saturating characteristic of an output level from a high-frequency transistor amplifier. As shown in FIG. 3A, an amplitude-limit-level of limiter 115 should be set at a rather lower level than a saturating-output-level of the circuits provided after spreader 116 disposed at a rear stage of limiter 115. Then as shown in FIG. 3B, an SNR of the RSSI voltage is kept constant even against an intense antenna input signal. FIGS. 4A and 4B illustrate that an input level is limited by adding limiter amplifier 115 in accordance with this embodiment. This level-setting prohibits an input exceeding the saturating level from being fed into a circuit after de-spreader 116 as shown in FIG. 4A. The circuit between de-spreader 116 and the second IF section 117 thus can always operate in a linearly-operating region. This limiter amplifier 115 allows IF section 117 to output a signal with an SNR free from being deteriorated against an intense signal supplied as shown in FIG. 4B. As a result, a stable operation of the de-spreader can be expected.

Adding limiter amplifier 115 to the system is sometimes insufficient for the receiver to exert its characteristics to the full extent, and a few problems as follows might occur. The first possible problem is a characteristics deterioration of the receiver due to blocking, i.e. receiving sensitivity to a desired signal lowers. The present invention provides a method to overcome this problem: A limiter amplifier is set after an input signal is converted to the first IF by RF receiver 112, and yet it is set prior to a de-spreader. A band-pass-filter is set prior to the limiter amplifier.

In case of a method that a limiter amplifier is directly provided to RF receiver 112 of the receiver, the limiter amplifier operates to an intense interference signal other than a signal of a received channel, thereby lowering its gain. Thus the receiving-sensitivity to a desired signal is lowered, i.e. characteristic deterioration due to blocking is thus produced. Total receiving-sensitivity of the receiver, i.e. noise figure (NF), is substantially influenced by NF and gain of amplifying elements on a side nearer to a receiving antenna. Therefore, this method, i.e. the limiter amplifier is provided to RF receiver 112 so that a gain can be lowered, allows the receiving sensitivity to lower.

The present invention provides another method to overcome the first possible problem: Limiter amplifier 115 and de-spreader 116 are set after the input signal is converted to the first IF by down-converter 113, thereby alleviating the deterioration of the receiving sensitivity. This structure allows an operating frequency of semiconductor devices to lower down to the first IF. These semiconductor devices make up a double-balanced-mixer used as de-spreader 116 and the limiter amplifier. Therefore, this structure contributes to cost reduction of the receiver.

In receiver 110, a plurality of communication channels available within a rather wide band, e.g. 900 MHz, ISM band, are firstly amplified by RF receiver 112, then a desirable channel is selected and converted to the first IF by down-converter 113. This operation is the same as that of a regular type double-super-heterodyne receiver. Since the first IF is a fixed frequency, band-pass-filter 114, which passes only a single communication channel, can be set at a prior stage to limiter amplifier 115. This filter can block an intense interference signal included in other communication channels. As a result, this structure can solve the problem of characteristics deterioration of the receiver due to the blocking which is produced by adding the limiter amplifier.

The second possible problem caused by adding the limiter amplifier is the narrower dynamic range of the receiver. In this embodiment, an AGC function is added to RF receiver 112 in order to overcome this problem.

The amplitude of amplifier 115 is limited to a level as low as before the RSSI is saturated, and other features of amplifier 115 are also used, whereby the objectives of the present invention are achieved. However, too much limitation on the amplitude is not preferable because the deterioration discussed above is induced due to the blocking. For the overall receiver, a dynamic range of an input level vs. an RSSI voltage is narrowed, in general, by adding the limiter amplifier as shown in FIG. 4A. In order to overcome this problem, as shown in FIG. 2, the AGC function is provided to RF receiver 112 which is on a stage prior to the limiter amplifier added, thereby solving this problem with ease. The level of limiting the amplitude of limiter amplifier 115 should be set at a rather lower level than a level where the RSSI is saturated considering the dispersion of the components making up the circuits. The AGC function placed at the stage prior to the limiter amplifier allows the dynamic range to be widened as well as be reluctantly saturated by an intense input-signal. As a result, field strength can be detected normally by the RSSI.

Figure 5:
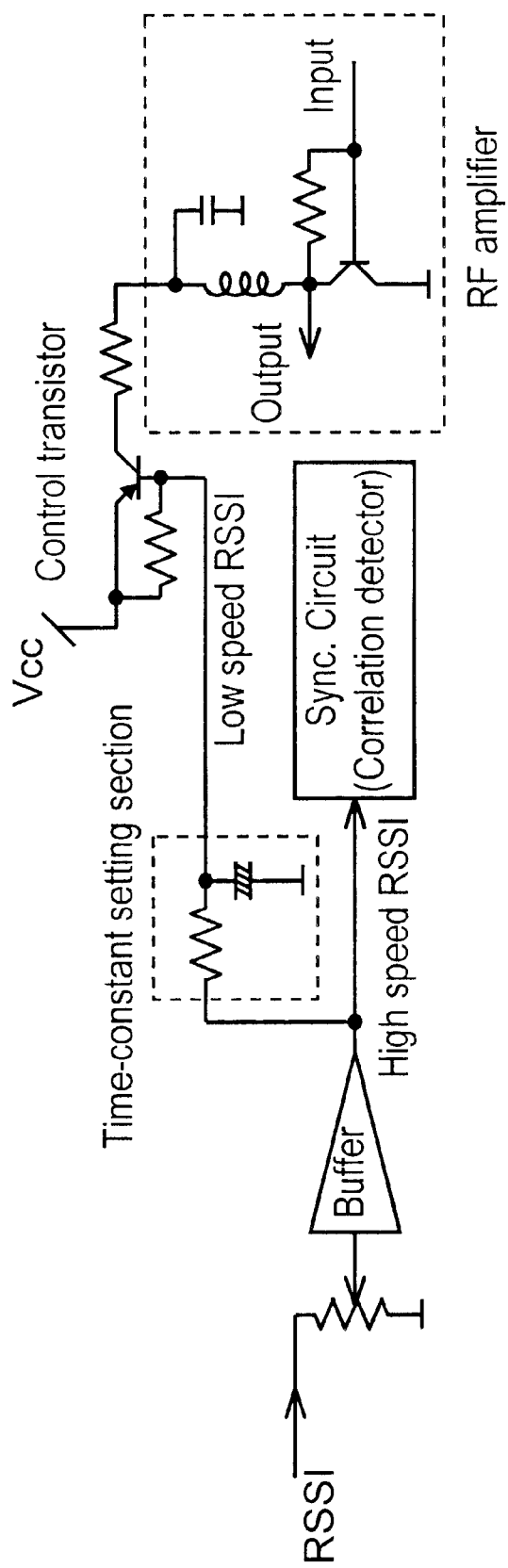
FIG. 5 is a circuit diagram detailing a time-constant-setting section shown in FIG. 2 and AGC function.

The AGC function in accordance with this embodiment is actualized, as shown in FIG. 5, in a simple circuit which controls a bias of a low-noise-amplifier in the RF receiver by an RSSI voltage thereby adjusting the gain. Further, because the RSSI is the same one used in a sync circuit of the conventional structure, the AGC function can be added with a little cost increase of the receiver. FIG. 6 illustrates characteristics illustrating the relations between a receiver input level and an RSSI voltage level in two cases, i.e. one is when the AGC function is not added to the spread spectrum communication apparatus, the other is when the AGC function is added to the apparatus. FIG. 6 shows that the dynamic range of the RSSI can be improved by as much as 30 dB.

The simple and inexpensive AGC circuit discussed above can alleviate the deterioration of blocking-characteristics due to adding the limiter as well as widen the dynamic range of receiver's input level vs. RSSI voltage.

The AGC function, however, still does not produce a satisfactory result. Here is the third possible problem, i.e. an output signal from the RSSI is simply fed into both of the sync circuit and the AGC circuit, and this would deteriorate the characteristics of detecting correlation. In this embodiment, different time constants are set to the sync circuit and the AGC circuit respectively in order to overcome this third possible problem.

Figure 7A:
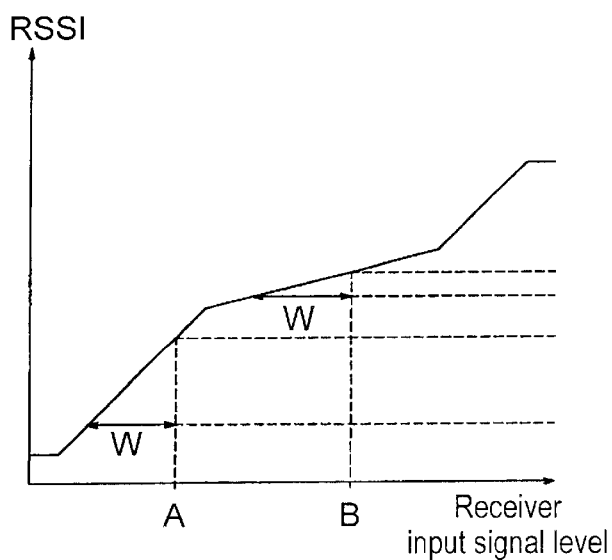
FIG. 7 contains graphs illustrating deterioration of detecting correlation characteristic due to adding the AGC to the apparatus.
Figure 7B:
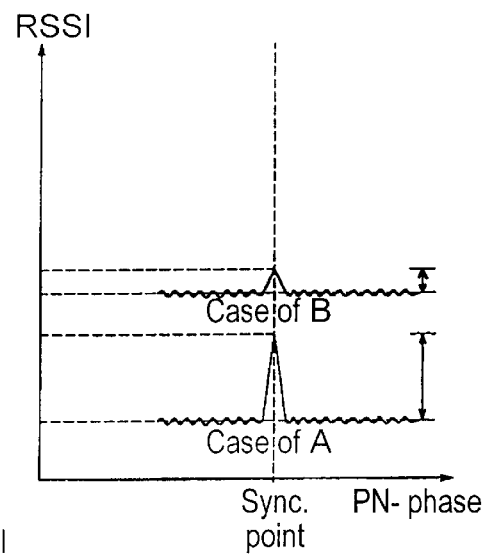
Figure 8A:
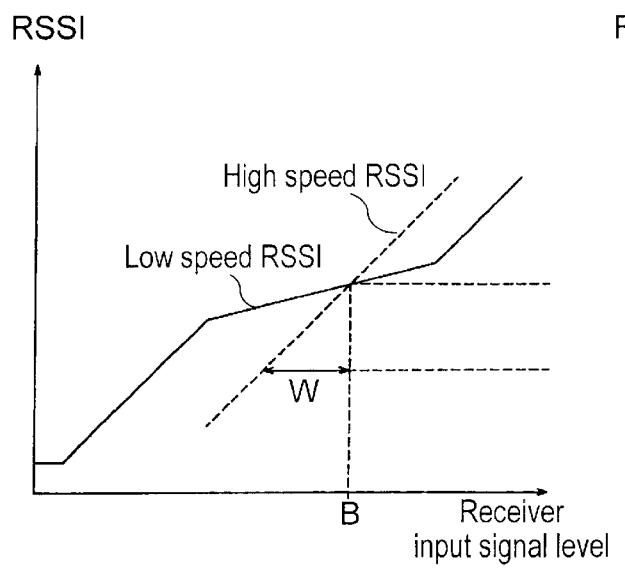
FIG. 8 contains graphs illustrating effects when two types of time constants are respectively set on an output voltage from the RSSI of the spread spectrum communication apparatus in accordance with the exemplary embodiment of the present invention.
Figure 8B:
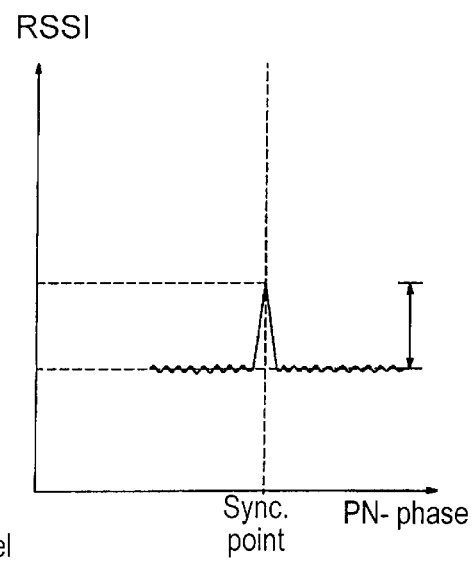

FIG. 7 illustrates that the characteristics of detecting correlation are deteriorated by adding the AGC function. Indeed the AGC added can widen a range of an input level in which the RSSI can operate, but a slant of receiver's input level vs. RSSI voltage becomes smaller in a range under the gain control. This deteriorates the signal to noise ratio (SNR) of RSSI voltage supplied to the sync circuit, and eventually induces an "out of sync" at detecting the correlation.

As shown in FIG. 2, time-constant-setter 121 setting a large time constant is provided to the RSSI voltage input side on the AGC circuit so that the circuit including setter 121 operates at a low speed, on the other hand, the sync circuit without such a setter keeps operating at a high speed. As such, providing two time constants to the output signal from RSSI allows the AGC circuit not to respond to high speed changes of RSSI voltage which performs lock-on operation. Because the sync circuit performs lock-on operation at as quick as 1.3 msec. cycle, and AGC circuit, on the other hand, has a large time constant. In other words, the output signal from the RSSI works to the sync circuit based on the large slant before the AGC function is added, therefore, the characteristics deterioration of detecting the correlation, which has occurred in the case when such a time constant has not been set, can be eliminated.

The AGC circuit, on the other hand, works to moderate changes of the RSSI voltage induced by field-strength-changes so that the RSSI can normally operate in a wide range of input levels. As a result, correlating operation can be normally performed.

As discussed above, adding the AGC circuit solves the problem of deteriorating the characteristics of detecting the correlation, effects completely the characteristic improvement against an intense input signal thanks to adding the AGC circuit, and realizes a stable operation of detecting the correlation.

Figure 9:
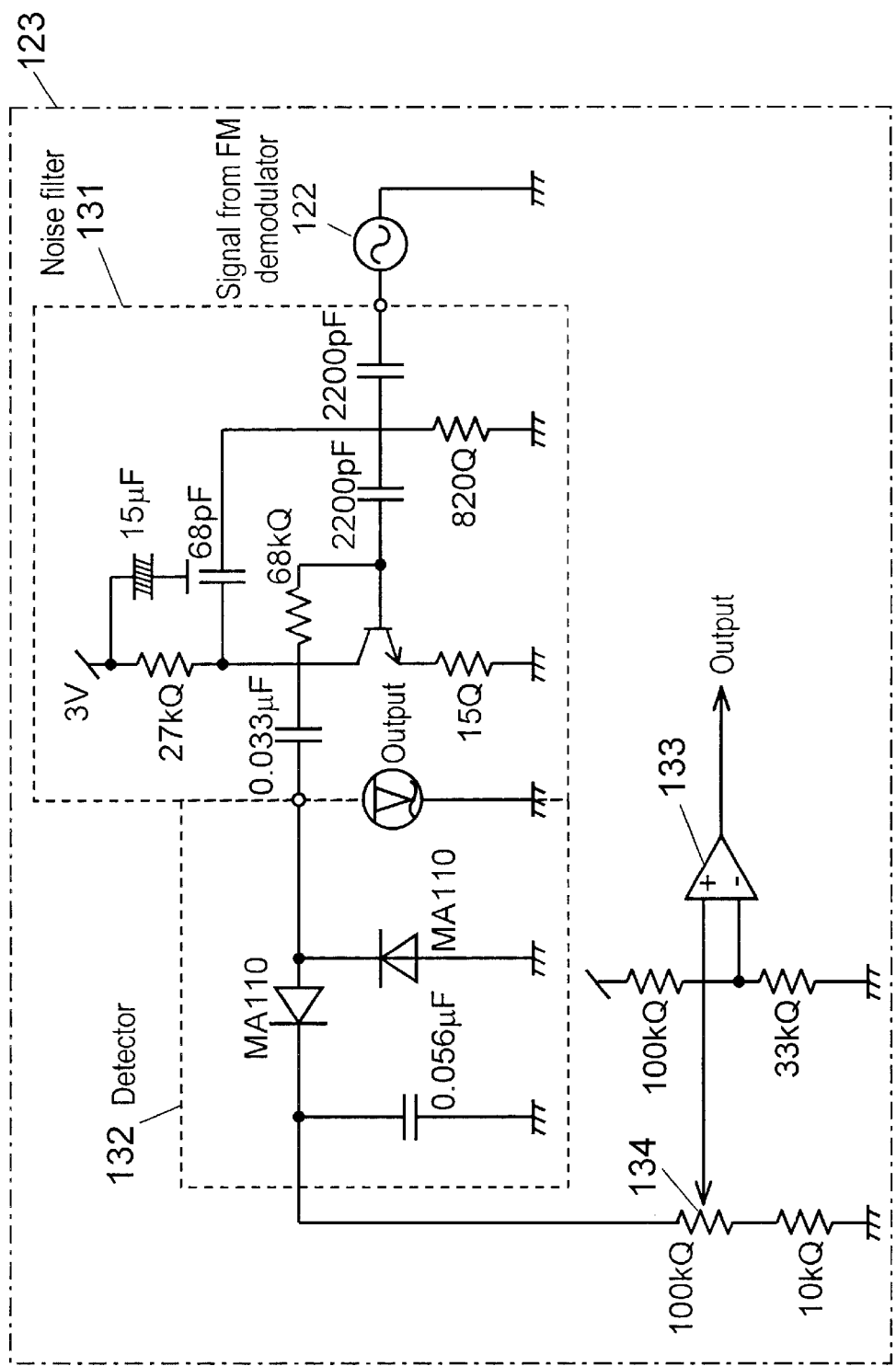
FIG. 9 is a circuit diagram detailing a noise-squelch circuit in accordance with the exemplary embodiment of the present invention.
Figure 10:
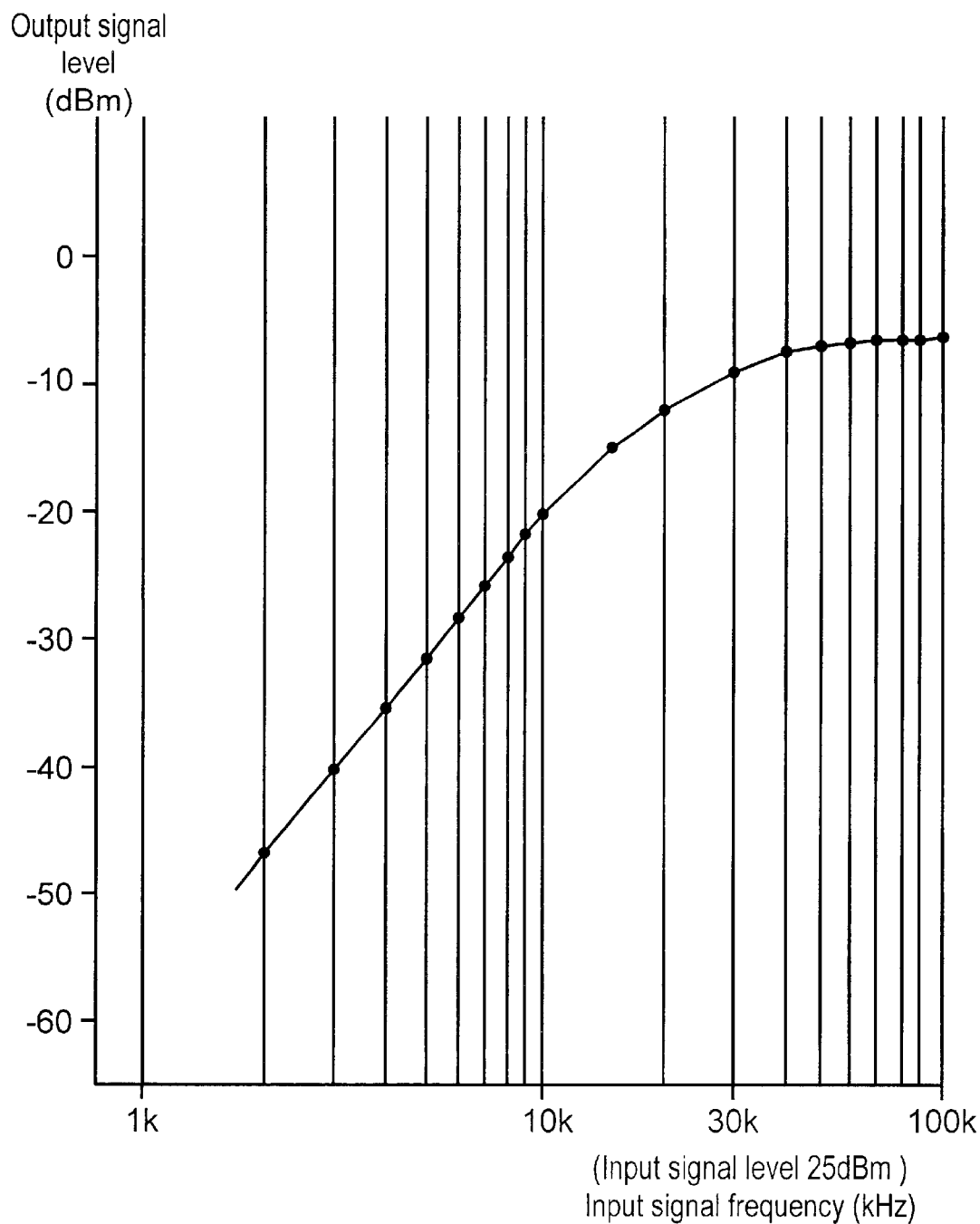
FIG. 10 is a graph illustrating a frequency characteristic of the noise-squelch circuit in accordance with the exemplary embodiment of the present invention.

The above description detailed the limiter amplifier and AGC circuit added to the spread-spectrum communication apparatus employing the double-super-heterodyne method. In addition to these two elements added, a sync-lost detecting circuit is demonstrated hereinafter. In this embodiment, noise-squelch circuit 123 as shown in FIG. 2 is added to FM demodulator 122 in order to detect a sync-lost. This squelch circuit 123 is simply constructed as same as the circuit used in a regular-type analog FM receiver. FIG. 9 details its circuit, and FIG. 10 illustrates a frequency characteristic of noise filter 131 making up squelch circuit 123. FIG. 10 tells that this noise filter passes frequency components over ca. 30 kHz.

The following description refers to how squelch circuit 123 functions as a sync-lost detecting circuit. In FIG. 9, using a filter amplifier, noise filter 131 amplifies white noise component over 30 kHz out of the detected output signal (information signal) supplied from FM demodulator 122 and then outputs the resultant signal to detector 132. Detector 132 detects the signal and outputs it in a form of DC level. Comparator 133 compares the DC level with a given threshold level and determines a level of the white noise. When the white noise level is large, i.e. when the detected DC level is greater than the threshold level, comparator 133 determines that a sync-lost has occurred. When the white noise level is small, i.e. when the detected DC level is smaller than the threshold level, comparator 133 determines that the sync is kept.

Figure 11:
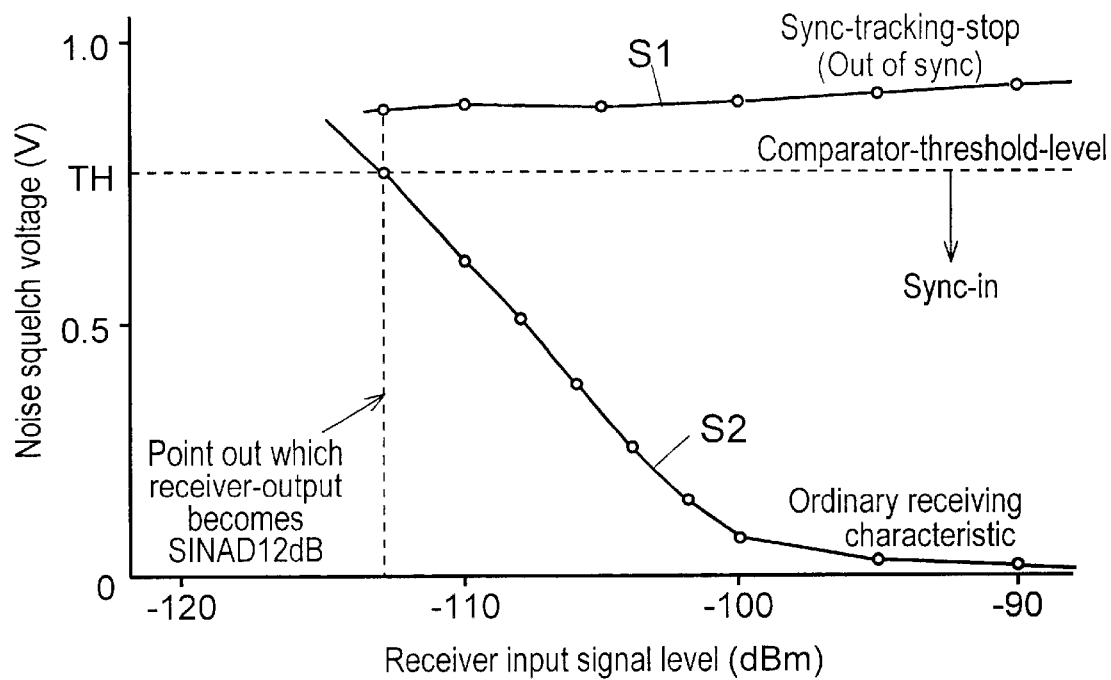
FIG. 11 is a graph illustrating relations between an input level of the receiver and a noise-squelch voltage.

FIG. 11 is a graph illustrating relations between a low input level (weak field strength) in a unit of dBm of the receiver and a noise-squelch voltage (an output voltage of variable resistor 134 in squelch circuit 123 shown in FIG. 9). This graph shows the weak field-strength produced by receiver 110 when squelch circuit 123 is added. In FIG. 11, an "out of sync" status (halt-tracking status) is represented by characteristic curve S1 and a normal status (normal receiving status) is represented by characteristic curve S2.

Variable resistor 134 setting a threshold value of squelch circuit 123 is adjusted so that.the threshold value is rendered to a receiving sensitivity level of the receiver (a level where a SNR of an audio output of the receiver becomes SINAD 12 dB). This is the same manner as the case when variable resistor 134 is employed to determine the weak-field strength of the conventional analog FM receiver. Under this adjusted condition, stop the sync-tracking operation intentionally to produce "out of sync" status, then a squelch voltage keeps staying at a higher value than the threshold value regardless of the input signal levels as shown by curve S1 in FIG. 11. Because PN code components do not attenuate substantially even up until an output section of de-spreader 116 and then still appears at an output section of FM demodulator 122. In actual, the PN code of 1.28 Mcps/127 chips has a minimum frequency component of 10 kHz, and the component of this 10 kHz plus its integral multiples appear on FM detected output signal. In the case of "out of sync" status, the squelch circuit shown in FIG. 9 outputs a higher level (a squelch voltage value) than the white noise level in the weak field-strength.

Figure 12A:
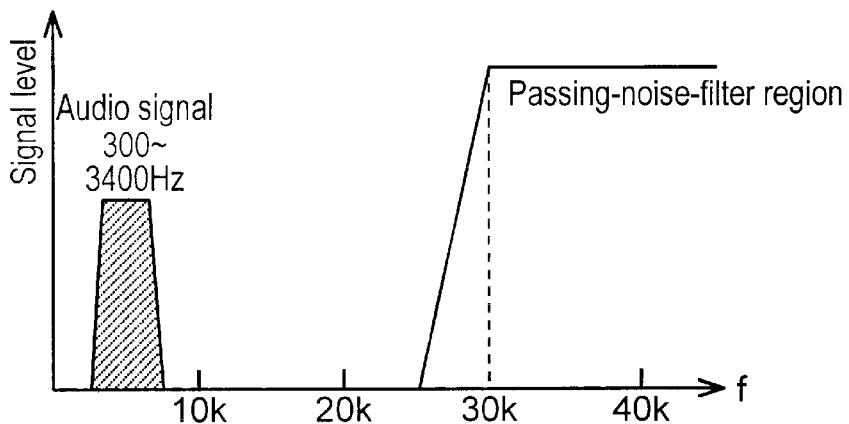
FIG. 12A shows a frequency characteristic when the apparatus operates in a normal synchronized condition.
Figure 12B:
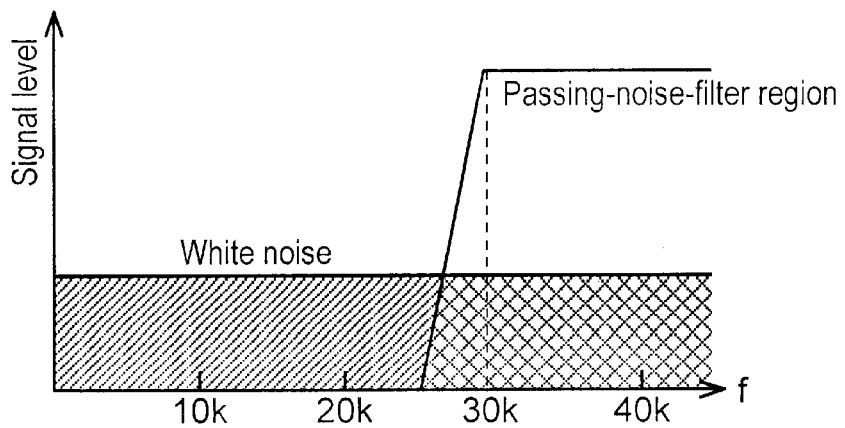
FIG. 12B shows a frequency characteristic in weak radio-field-strength.
Figure 12C:
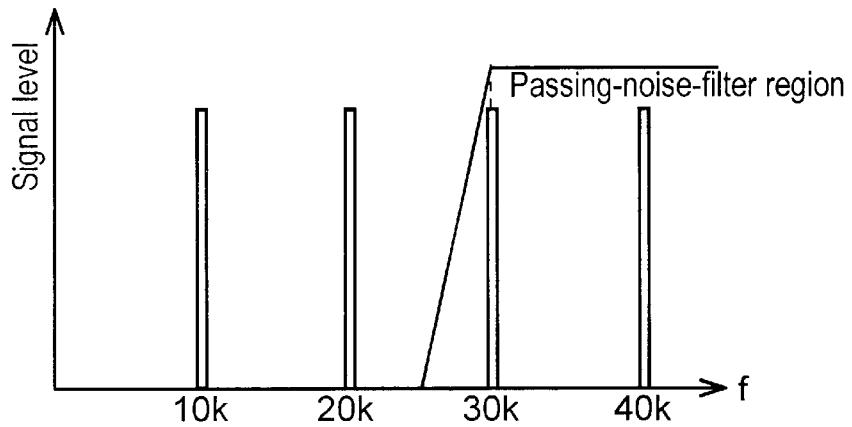
FIG. 12C shows a frequency characteristic at "out of sync".
Figure 13A:
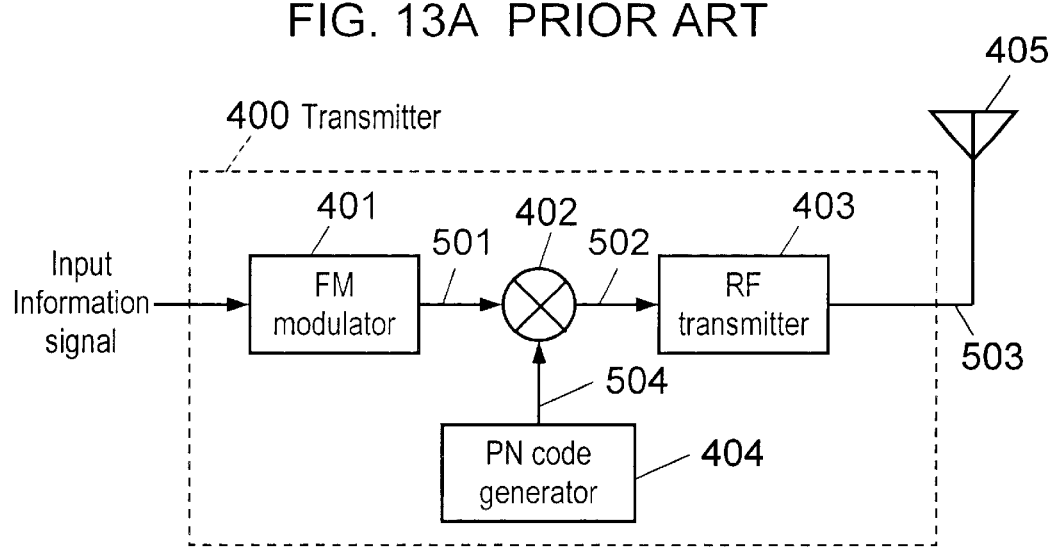
FIG. 13A is a block diagram illustrating a transmitter of a conventional spread-spectrum-communication apparatus.
Figure 13B:
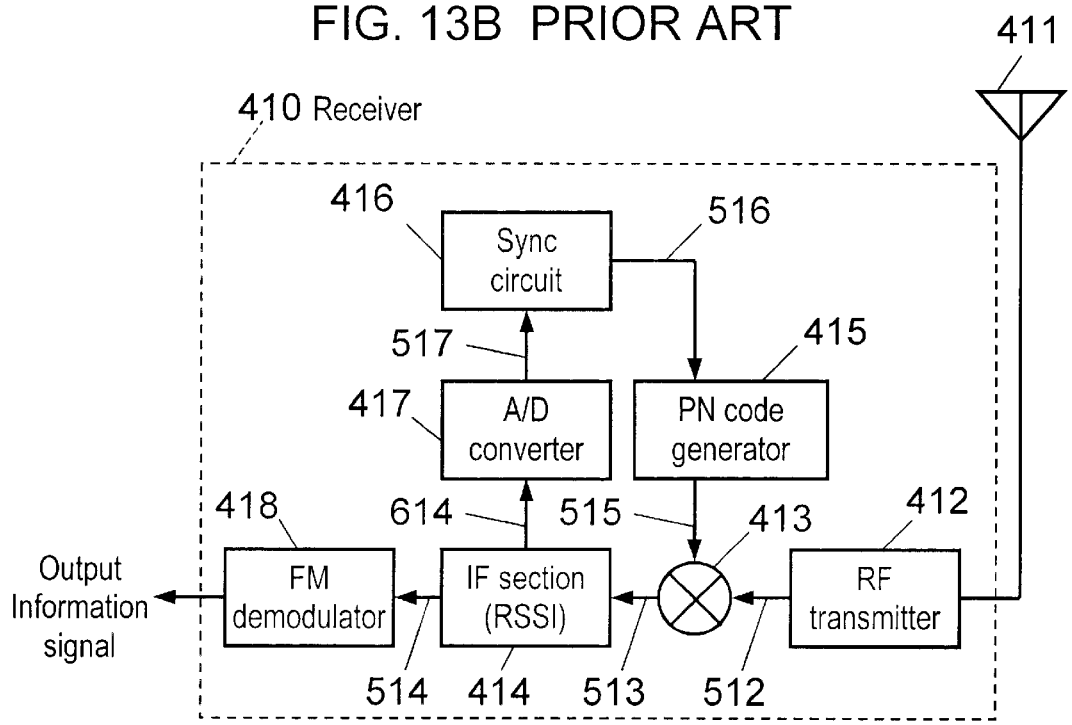
FIG. 13B is a block diagram illustrating a receiver of a conventional spread-spectrum-communication apparatus.
Figure 14A:
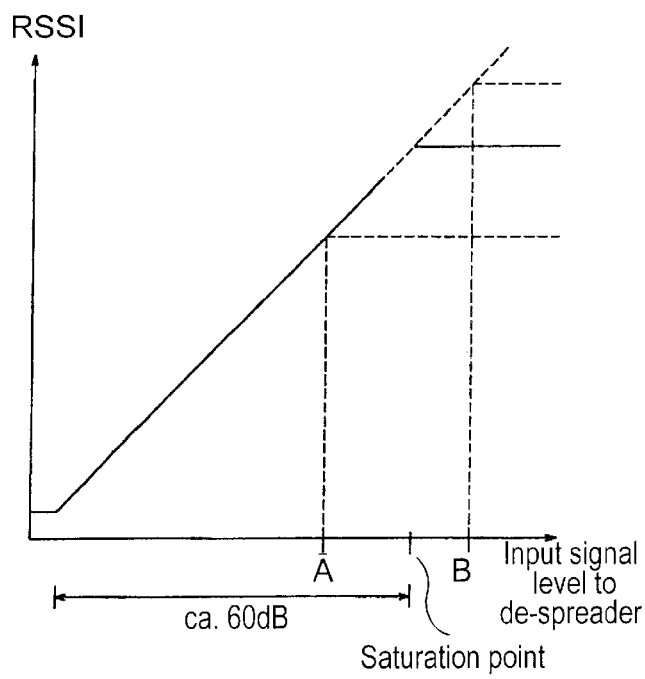
FIG. 14 contains graphs illustrating influence to detecting the correlation due to saturation of the RSSI voltage in the conventional case.
Figure 14B:
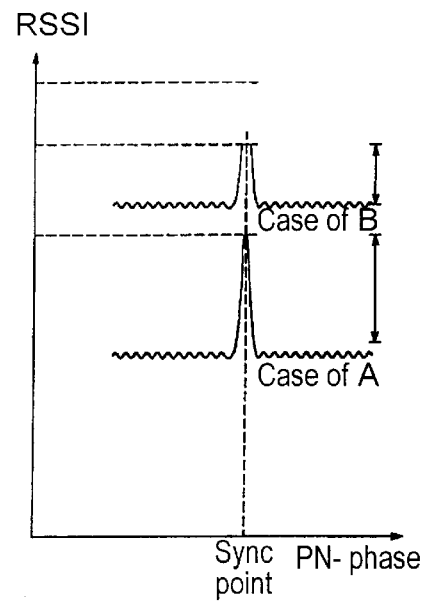

This squelch voltage value is detailed hereinafter with reference to FIG. 12. In the case of "sync-in" status, as shown in FIG. 12A, an audio signal is limited its frequency within 300–3,400 Hz band, and no high frequency component is available to pass noise filter 131. The squelch voltage thus stays close to zero "0". In the case of weak field-strength, as shown in FIG. 12B, only a component-passing noise filter 131 out of the white noise appears to be a squelch voltage noise. Further, in the case of "out of sync" status, as shown in FIG. 12C, spectrums of the PN code appear every 10 kHz, and only the components over 30 kHz and passing noise filter 131 appears as squelch voltage values.

As a result, when comparator 133 in FIG. 9 outputs level "H" (maximum noise), it means that the input level is less than the receiving sensitivity (extremely week field-strength) or the status is "out of sync". In other words, "out of sync" can be detected based on the output level from comparator 133. Thus comparator 133 has a function of detecting "out of sync" in addition to a function of detecting field-strength. The latter function is an original one to the conventional analog FM receiver.

The output level ("out of sync" detecting signal 223) from comparator 133 in squelch circuit 123 should be always monitored during the communication. When this "out of sync" detecting signal 223 stays at level H (maximum noise) for longer than a given period, it is determined that the system loses sync. Sync circuit 119 is notified of this situation by the signal. Then sync circuit 119 returns to the "sync tracking mode" and tries to track sync again. In the extremely weak field-strength area around a marginal communicative distance, the threshold level of comparator 133 straightly becomes the marginal receiving sensitivity.

The time constant (the given period discussed above) before sync is acquired again should be optimized responsive to respective operating conditions required by the applications of the spread-spectrum communication apparatus.

This embodiment discussed above proves that noise-squelch circuit 123 is added to FM demodulator 122 thereby functioning as the "out of sync" detecting circuit. Even if an analog-based communication method is employed, the "out of sync" during the communication can be detected. When the "out of sync" is detected, the sync circuit can immediately move to "sync-tracking-mode". Since noise-squelch circuit 123 used in an analog FM receiver is employed as the "out of sync" detecting circuit, it contributes to cost reduction of the circuit and simplifying the circuit structure.

The present invention thus achieves the following advantages:

(a) Unsatisfactory operation of the de-spreader due to the saturation of receiver's RSSI can be solved.

(b) The dynamic range of the receiver can be substantially widened.

(c) The "out of sync" can be detected with ease.

The present invention realizes these advantages in a simple and inexpensive circuit, thereby providing a spread-spectrum communication apparatus having these advantages in this circuit. The following three items contribute to achieving this goal:

(1) Employing a receiver using the double-super-heterodyne method, and providing a limiter amplifier to a first IF section of the receiver;

(2) Providing an AGC function to an RF receiver of the receiver, and allowing the AGC function to operate with a substantially large time constant comparing with a cycle of lock-on operation of the receiver; and (3) Providing a noise-squelch circuit, which has been generally used in an analog FM receiver, to an FM demodulator in order to detect an "out of sync" of the receiver.

What is claimed is:

1. A spread-spectrum communication apparatus transmitting and receiving an information signal in a high-frequency-band, said apparatus comprising:

(a) a radio frequency (RF) receiver for receiving and amplifying the high-frequency spread-spectrum modulated by the information signal;

(b) a de-spreader for reproducing the modulated signal from the high-frequency spread-spectrum modulated signal;

(c) an analog demodulator for reproducing the information signal from the modulated signal;

(d) a received signal strength indicator (RSSI) for detecting a strength of the modulated signal reproduced by said de-spreader, and for feeding back a resultant detection to said de-spreader; and (e) a limiter circuit disposed at a stage prior to said de-spreader for limiting an amplitude of an input signal such that the modulated signal does not exceed a saturating level of said RSSI.

2. The spread-spectrum communication apparatus as defined in claim 1, wherein an input signal fed into said RF receiver is processed by a double-super-heterodyne method, and said de-spreader and said limiter circuit are disposed at a first intermediate frequency (IF) section.

3. The spread-spectrum communication apparatus as defined in claim 1, wherein a band-pass-filter is disposed at a stage prior to said limiter circuit.

4. The spread-spectrum communication apparatus as defined in claim 1, wherein said limiter circuit provides an amplitude limitation in a lower-side vicinity of a saturating level of said RSSI.

5. The spread-spectrum communication apparatus as defined in claim 1, wherein automatic-gain-control (AGC) function is provided to said RF receiver.

6. The spread-spectrum communication apparatus as defined in claim 1, wherein an output signal from said RSSI is shared by said de-spreader for detecting correlation and said RF receiver for automatic-gain-control (AGC).

7. The spread-spectrum communication apparatus as defined in claim 1, wherein an output signal from said RSSI is shared by said de-spreader for detecting correlation and said RF receiver for automatic-gain-control (AGC), and different time constants are respectively set for detecting the correlation of said de-spreader and for the AGC of said RF receiver.

8. The spread-spectrum communication apparatus as defined in claim 1 further comprising an "out of sync" detecting circuit for detecting whether or not de-spread spectrum loses sync with the information signal supplied from said analog demodulator, and for feeding back a resultant detection to said de-spreader to configure said de-spreader in either a sync-tracking-mode or a sync-holding-mode.

9. The spread-spectrum communication apparatus as defined in claim 1, wherein a noise-squelch circuit is provided as said "out of sync" detecting circuit.

10. A spread-spectrum communication apparatus transmitting and receiving an information signal in a high-frequency-band, said apparatus comprising:

(a) a radio frequency (RF) receiver for receiving and amplifying the high-frequency spread-spectrum modulated by the information signal;

(b) a de-spreader for reproducing the modulated signal from the high-frequency spread-spectrum modulated signal;

(c) an analog demodulator for demodulating the information signal from the demodulated signal;

(d) a received signal strength indicator (RSSI) for detecting a strength of the modulated signal reproduced by said de-spreader, and for feeding back a resultant detection to said de-spreader; and (e) an "out of sync" detecting circuit for detecting whether or not de-spread spectrum loses sync with the information signal supplied from said analog demodulator and for feeding back a resultant detection to said de-spreader to configure said de-spreader in either a sync-tracking-mode or a sync-holding-mode.

11. The spread-spectrum communication apparatus as defined in claim 10, wherein said "out of sync" detecting circuit is a noise-squelch circuit.

12. A spread-spectrum communication apparatus transmitting and receiving an information signal in a high-frequency-band, said apparatus including a transmitter and a receiver, said transmitter comprising:

(a) an analog modulator for modulating the information signal into a modulated signal;

(b) a spreader for producing a spread-spectrum modulated signal by modulating the modulated signal by a spreading code;

(c) a radio frequency (RF) transmitter for transmitting and amplifying the spread-spectrum modulated signal into a high-frequency spread-spectrum modulated signal; and (d) an RF receiver for receiving and amplifying the high-frequency spread-spectrum modulated signal;

(e) a de-spreader for reproducing the modulated signal from the high-frequency spread-spectrum modulated signal;

(f) an analog demodulator for reproducing the information signal from the modulated signal;

(g) a received signal strength indicator (RSSI) for detecting a strength of the modulated signal reproduced by said de-spreader, and for feeding back a resultant detection to said de-spreader; and (h) a limiter circuit disposed at a stage prior to said de-spreader for limiting an amplitude of an input signal such that the modulated signal does not exceed a saturating level of said RSSI.

13. The spread-spectrum communication apparatus as defined in claim 12, wherein an input signal fed into said RF receiver is processed by a double-super-heterodyne method, and said de-spreader and said limiter circuit are disposed at a first intermediate frequency (IF) section.

14. The spread-spectrum communication apparatus as defined in claim 12, wherein a band-pass-filter is disposed at a stage prior to said limiter circuit.

15. The spread-spectrum communication apparatus as defined in claim 12, wherein said limiter circuit provides an amplitude limitation in a lower-side vicinity of a saturating level of said RSSI.

16. The spread-spectrum communication apparatus as defined in claim 12, wherein an automatic-gain-control (AGC) function is provided to said RF receiver.

17. The spread-spectrum communication apparatus as defined in claim 12, wherein an output signal from said RSSI is shared by said de-spreader for detecting correlation and said RF receiver for automatic-gain-control (AGC).

18. The spread-spectrum communication apparatus as defined in claim 12, wherein an output signal from said RSSI is shared by said de-spreader for detecting correlation and said RF receiver for automatic-gain-control (AGC), and different time constants are respectively set for detecting the correlation of said de-spreader and for the AGC of said RF receiver.

19. The spread-spectrum communication apparatus as defined in claim 12 further comprising an "out of sync" detecting circuit for detecting whether or not de-spread spectrum loses sync with the information signal supplied from said analog demodulator, and for feeding back a resultant detection to said de-spreader to configure said de-spreader in either a sync-tracking-mode or a sync-holding-mode.

20. The spread-spectrum communication apparatus as defined in claim 12, wherein a noise-squelch circuit is provided as said "out of sync" detecting circuit.

21. A spread-spectrum communication apparatus transmitting and receiving an information signal in a high-frequency-band, said apparatus comprising:

(a) an analog modulator for modulating the information signal into a modulated signal;

(b) a spreader for producing a spread-spectrum modulated signal by modulating the modulated signal by a spreading code;

(c) a radio frequency (RF) transmitter for transmitting and amplifying the spread-spectrum modulated signal into a high-frequency spread-spectrum modulated signal;

(d) an RF receiver for receiving and amplifying the high-frequency spread-spectrum modulated signal;

(e) a de-spreader for reproducing the modulated signal from the high-frequency spread-spectrum modulated signal;

(f) an analog demodulator for reproducing the information signal from the demodulated signal;

(g) a received signal strength indicator (RSSI) for detecting a strength of the modulated signal reproduced by said de-spreader, and for feeding back a resultant detection to said de-spreader; and (h) an out-of-sync detecting circuit for detecting whether or not de-spread spectrum loses sync with the information signal supplied from said analog demodulator, and for feeding back a resultant detection to said de-spreader to configure said de-spreader in either a sync-tracking-mode or a sync-holding-mode.

22. The spread-spectrum communication apparatus as defined in claim 21, wherein said out-of-sync detecting circuit is a noise-squelch circuit.

* * * * *